US012388501B2

(12) United States Patent
Mukherjee

(10) Patent No.: US 12,388,501 B2
(45) Date of Patent: Aug. 12, 2025

(54) DECODE SIGNAL COMPENSATION IN A WIRELESS SYSTEM

(71) Applicant: Charter Communications Operating, LLC, St. Louis, MO (US)

(72) Inventor: Amitav Mukherjee, Elk Grove, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/380,846

(22) Filed: Oct. 17, 2023

(65) Prior Publication Data

US 2024/0048194 A1 Feb. 8, 2024

Related U.S. Application Data

(63) Continuation of application No. 17/573,030, filed on Jan. 11, 2022, now Pat. No. 11,811,470.

(51) Int. Cl.
*H04B 7/0456* (2017.01)
*H04B 1/00* (2006.01)
(Continued)

(52) U.S. Cl.
CPC .......... *H04B 7/0456* (2013.01); *H04B 1/0032* (2013.01); *H04B 1/64* (2013.01); *H04B 1/662* (2013.01)

(58) Field of Classification Search
CPC ... H04L 5/0053; H04L 5/0023; H04L 5/0048; H04L 5/0082; H04L 5/005; H04L 1/0048;
(Continued)

(56) References Cited

U.S. PATENT DOCUMENTS 9,306,641 B1 4/2016 Yang et al.
10,804,984 B1 * 10/2020 Cheraghi .............. H04L 25/067
(Continued)

OTHER PUBLICATIONS

A. Mukherjee, 5G New Radio: Beyond Mobile Broadband. 1st ed., Artech House, Oct. 31, 2019, pp. 78-93, Chapter 4, Disaggregated 5G RAN.
(Continued)

Primary Examiner — Eva Y Puente
(74) Attorney, Agent, or Firm — Armis IP Law, LLC

(57) ABSTRACT

A communication management resource implements an iterative process to derive settings for digital precoder W, analog precoder A, and decode function D with a bandwidth-limited fronthaul link between the application of digital precoder W and the application of analog precoder A. The iterative process includes: for a first instance of digital precoder W and decode function D, optimize an instance of the analog precoder A; and based on the optimized instance of the analog precoder A, optimize a second instance of the digital precoder W and the decode function D. In one implementation, for each iteration of multiple iterations, the communication management resource: i) optimizes an
(Continued)

instance of the analog precoder A based on an instance of the digital precoder W and the decode function D, and ii) optimizes an instance of the digital precoder W and the decode function D based on the instance of the analog precoder A.

20 Claims, 8 Drawing Sheets

(51) Int. Cl.
  *H04B 1/64* (2006.01)
  *H04B 1/66* (2006.01)
(58) Field of Classification Search
  CPC ..... H04L 1/0071; H04L 27/36; H04B 7/0413; H04B 7/0617; H04B 7/024; H04B 7/0456; H04B 7/088; H04B 7/0452; H04B 7/0626; H04B 7/0695; H04W 16/28; H04W 72/046; H04W 72/23; H04W 24/10; H04W 74/0833; H04W 48/16; H04W 24/08; H04W 80/02
  USPC ........................................................ 375/262
  See application file for complete search history.

(56) References Cited

U.S. PATENT DOCUMENTS

| | | |
|---|---|---|
| 2007/0201632 A1 | 8/2007 | Ionescu |
| 2015/0244418 A1 | 8/2015 | Verbin et al. |
| 2016/0080051 A1 | 3/2016 | Sajadieh et al. |
| 2019/0229778 A1* | 7/2019 | Chopra ................ H04B 7/0639 |
| 2020/0100140 A1 | 3/2020 | Bendlin et al. |
| 2020/0343948 A1* | 10/2020 | Shaban ................ H04B 7/0456 |
| 2021/0050892 A1 | 2/2021 | Park et al. |
| 2021/0320698 A1 | 10/2021 | Sharafat et al. |
| 2022/0029734 A1 | 1/2022 | Abdoli et al. |
| 2022/0368385 A1 | 11/2022 | Song et al. |

OTHER PUBLICATIONS

International Search Report and the Written Opinion, PCT/US2023/010110, Apr. 11, 2023, pp. 1-15.
Jacobsson, et al., "Linear Precoding with Low-Resolution DACs for Massive MU-MIMO-OFDM Downlink", IEEE Transactions on Wireless Communication, vol. 18, No. 3, 2019, pp. 1-15.
Jing Li, et al., "Hybrid beamforming designs for 5G new radio with fronthaul compression and functional splits", IET Communications, The Institution of Engineering and Technology, GB, vol. 14, No. 20, Nov. 30, 2020, pp. 3676-3685, XP006098112.
Mohebbi Ali et al., "Joint Iterative Training-based Hybrid Precoding and Combining for Millimeter Wave Systems", 2019 IEEE Canadian Conference of Electrical and Computer Engineering (CCECE), IEEE, May 5, 2019, pp. 1-4, XP033628137.
O-RAN Alliance, "O-RAN Working Group 4 (Open Fronthaul Interfaces WG) Control, User and Synchronization Plane Specification", copywritten 2022, pp. 1-258, O-RAN.WG4.CUS,0-v08.01, Technical Specification.
Park, et all, "Hybrid Precoding for Massive MIMO Systems in Cloud RAN Architecture with Capacity-Limited Fronthauls", Sep. 22, 2017, pp. 1-13.
Tang, et all, "Optimal Design of Non-Regenerative MIMO Wireless Relays" IEEE Transactions on Wireless Communications, vol. 6, No. 4, Apr. 1, 2007, pp. 1-11.
Zhao Xingyu et al., "Partially-Connected Hybrid Beamforming for Spectral Efficiency Maximization via a Weighted MMSE Equivalence", IEEE Transactions on Wireless Communications, IEEE Service Center, Piscataway, NJ, US, vol. 20, No. 12, Jun. 29, 2021, pp. 8218-8232, XP011892866.
Zhao, et al., "Analog Versus Hybrid Precoding for Multiuser Massive MIMO with Quantized CSI Feedback", Jun. 1, 2020, pp. 1-13.

* cited by examiner

DECODE SIGNAL COMPENSATION IN A WIRELESS SYSTEM

RELATED APPLICATION

This application is a continuation application of earlier filed U.S. patent application Ser. No. 17/573,030 entitled "DECODE SIGNAL COMPENSATION IN A WIRELESS SYSTEM," filed on Jan. 11, 2022, the entire teachings of which are incorporated herein by this reference.

BACKGROUND

FIG. 1 is an example diagram illustrating of conventional beamforming at a wireless base station.

Hybrid beamforming or precoding is a MIMO (Multiple-Input Multiple-Output) signal processing technique designed for massive MIMO systems. In order to reduce hardware costs, each antenna does not have a separate, dedicated RF chain comprising a DAC (Digital-to-Analog Converter), a power amplifier, a mixer, etc. Instead, multiple antenna elements share a RF chain, and the MIMO precoding is separated into a digital portion (at baseband) and an analog portion (at RF) implemented using a phase shifter network. An example is shown in FIG. 1 where there are M total antennas, K RF chains with K<M, each RF chain drives a subset of the antennas, the digital precoder matrix is denoted as W, and the analog precoder is denoted as A.

The overall DL transmit signal vector for either a single user or multiple users can be written as:

$$x = AWs,$$

where s is the K-dimensional information signal, digital precoder W is a K×K complex matrix, analog precoder A is M×K. Each element of A has the form $1/\sqrt{M}\, e^{\hat{}j\theta}$ where phase shift $\theta$ is taken from a codebook of pre-defined values.

The received signal at a K-antenna UE or K SISO (Single-Input Single-Output) UEs (User Equipment) is y=Hx+n, and the UE may apply a receive filter D to recover s, where H is the K×M fading channel matrix and n is additive noise.

In a disaggregated RAN (Radio Access Network) with a PHY functional split as espoused by the O-RAN Alliance, the PHY functions may be split between the RU (Radio Unit) and the distributed or digital unit (DU). Protocol layers above the PHY (e.g., MAC, RLC, PDCP, SDAP) may be located at the central unit (CU). The RU-DU transport link is known as fronthaul and CU-DU transport link is known as mid-haul. CPRI or eCPRI is typically used as the mid-haul and fronthaul transport protocol.

A RU that conforms to the O-RAN PHY functional split architecture is referred to as an O-RU. There are two categories of O-RU:
  Category A: Does not perform digital MIMO precoding (only analog beamforming). Simpler implementation.
  Category B: Performs digital MIMO precoding in addition to analog beamforming. More complex O-RU.

Compression of I-Q samples is generally performed on fronthaul traffic between the O-DU and O-RU in order to reduce bandwidth requirements. For example, on the DL the O-DU performs compression and the O-RU performs decompression. The compression is lossy due to the use of mu-law or a-law (logarithmic) compression and decompression schemes that reduce the dynamic range of the input signal.

So-called mu-law compression on input sample x, $-1 \le x \le +1$, is defined as $F(x) = \text{sgn}(x)\, \ln(1+\mu|x|)/\ln(1+\mu)$ where sgn(.) is the sign function and $\mu=255$, for example. Decompression $F\hat{}(-1)(x)$ is the inverse operation.

BRIEF DESCRIPTION OF EMBODIMENTS

There are deficiencies associated with conventional techniques of providing wireless connectivity. For example, the conventional use of lossy I-Q compression and decompression on a respective fronthaul communication link between a DU processing node and an RU processing node induces distortions in the baseband signal available to the RU due to quantization (compression/decompression) errors. This is particularly problematic for Category A O-RUs since the quantization impacts the digital precoder applied at the DU.

Conventional hybrid MIMO precoding solutions for the joint optimization of analog precoder A and digital precoder W are not optimal since they do not account for fronthaul communication link quantization errors.

In contrast to conventional techniques, embodiments herein propose new DL hybrid MIMO precoding solutions for physical-layer functional splits with fronthaul compression. The solutions are designed for a single user (a.k.a., SU-MIMO) with multiple receive antennas.

More specifically, a system as discussed herein includes a communication management resource. The communication management resource produces a receiver-side decode function D. The decode function D is generated via an iterative process based on a transmitter-side digital precoder W and an analog precoder A implemented in a wireless network to transmit a wireless communication including an original signal (such as data). In one embodiment, the iterative process includes: for each iteration of multiple iterations: i) optimizing an instance of the analog precoder A based on an instance of the digital precoder W and the decode function D, and ii) optimizing an instance of the digital precoder W and the decode function D based on the optimized instance of the analog precoder A.

Subsequent to finalizing configurations of the digital precoder W, analog precoder A, and the decode function D, via the iterative process, the communication management resource or other suitable entity communicates the finalized decode function D to a decoder associated with a wireless communication device. The decoder of the wireless communication device applies the decode function D to wireless communications received over multiple antennas of the wireless communication device to reproduce a rendition of an original signal transmitted in the wireless communication by the wireless base station. Application of the decode function D to the wireless communication received over multiple antennas of the wireless communication device reproduces a rendition of the original signal transmitted in the wireless communication by the wireless base station.

In addition to generating the decode function D, the iterative process also includes generating the digital precoder W and the analog precoder A. For example, in one embodiment, the iterative process includes: for a first instance of digital precoder W and decode function D, optimize an instance of the analog precoder A; and based on the optimized instance of the analog precoder A, optimize a second instance of the digital precoder W and the decode function D. These operations can be repeated such that the iterative process includes, for each iteration of multiple iterations: i) optimizing an instance of the analog precoder A based on an instance of the digital precoder W and the decode function D, and ii) optimizing an instance of the digital precoder W and the decode function D based on the instance of the analog precoder A.

As previously discussed, subsequent to converging on final configurations of decode function D, the digital precoder W, and the analog precoder A, via the iterative process, embodiments herein include implementing the final digital precoder W at a first processing node in the wireless network; and implementing the final analog precoder A at a second processing node in the wireless network, the analog precoder A applied to a first signal received over a bandwidth limited fronthaul communication link from the first processing node to produce a second signal.

In further embodiments, the wireless network implements the digital precoder W at a first processing node in the wireless network. The wireless network implements the analog precoder A at a second processing node in the wireless network.

In one embodiment, the analog precoder A is applied to a first signal received over a fronthaul communication link from the first processing node to produce a second signal. The second signal is captured in a wireless signal transmitted from the second processing node (such as a wireless base station) over a wireless communication link to the wireless communication device (such as user equipment, mobile communication device, etc.).

Further example embodiments herein include, via the communication management resource, implementing the iterative process to include producing digital precoder W, analog precoder A, and decode function D to account for a quantization effect of compression applied by a first processing node and decompression applied by a second processing node associated with the wireless base station. In still further example embodiments, the first processing node is a DU (Distributed Unit) processing node in the wireless network; the second processing node is a RU (Radio Unit) processing node transmitting the wireless communication in the wireless network.

Accordingly, embodiments herein include a method comprising or a system operable to: implement an iterative process to produce a decode function D; supply the decode function D to user equipment in a wireless network; and apply, at wireless communication device, the decode function D to a wireless signal received over multiple antennas of the wireless communication device (user equipment) to reproduce a rendition of an original signal transmitted by a wireless base station.

As previously discussed, the communication system or wireless network implements a digital precoder W at a first processing node in a wireless network; the communication system more wireless network implements an analog precoder A at a second processing node in the wireless network. The analog precoder A is applied to a first signal received over a fronthaul from the first processing node to produce a second signal.

Still further example embodiments herein include implementing a digital precoder W at a first processing node in a wireless network; the digital precoder W is applied to a received (original) signal s to produce signal Ws; the first processing node transmits a compressed rendition of Ws over a fronthaul communication link to a second processing node in the wireless network. A second processing node implements an analog precoder A. The analog precoder A is applied to a signal JWs received over the fronthaul communication link from the first processing node to produce signal AJWs, where J represents a non-linear function modeling a quantization effect of compression applied by the first processing node and decompression applied by the second processing node. The second processing node wirelessly transmits signal AJWs over a wireless channel H as HAJWs to a wireless communication device (user equipment) in the wireless network. A communication management resource associated with the wireless network implements an iterative process to produce a decode function D to decode the wireless signal is transmitted from the second processing node (such as a wireless base station) to the wireless vacation device. The wireless communication device applies the decode function D to a respective wireless signal HAJWs+n received at user equipment from the second processing node. Application of the decode function D to the wireless signal HAJWs+n produces signal s', where s' as generated from the respective wireless signal HAJWs+n is a rendition or reproduction of original signal s, and where n represents noise associated with wireless channel H.

As previously discussed, in one embodiment, the first processing node is a DU (Distributed Unit) processing node in the wireless network; the second processing node is a RU (Radio Unit) processing node in the wireless network.

In further example embodiments, the communication management resource generates the decode function D at the second processing node or other suitable entity; the second processing node communicates the decode function D from the second processing node to the user equipment. Additionally, or alternatively, the decode function D is generated at the user equipment.

The signals s and s' can be implemented or encoded in any suitable manner. In one embodiment, the signal s and signal s' are QAM or PSK signals with error-correction coding.

The iterative processes described herein can be implemented in any suitable manner. In one embodiment, implementation of the iterative process to produce the decode function D, digital pre-coder W, and/or analog pre-coder A includes: a.) initializing digital precoder W and decode function D in a first iteration i of the iterative process; b.) setting $A_i = V_2 Y U_1^H$, where $V_2$ is a set of right singular vectors of decode function D, $U_1$ is a set of left singular vectors of HKW, and Y is a diagonal power allocation matrix obtained via waterfilling; and c.) based on Ai, computing digital precoder W and decode function D by setting them to dominant right singular vectors and left singular vectors of an effective channel HA; computing Q based on waterfilling and rate R(H).

In still further example embodiments, the iterative process further includes: d.) in response to detecting that a stopping criterion of improvement in rate R(H) after a latest iteration of the iterative process is less than error value ε: i) normalizing analog precoder A and digital precoder W to meet power constraint P, and ii) terminating the iterative process.

Alternatively, the iterative process further includes: d.) in response to detecting that a stopping criterion of improvement in rate R(H) after a latest iteration of the iterative process for rate R(H) is greater than an error value ε: i) continuing execution of the iterative process at operation b.

In one embodiment, initial values of the digital precoder W and decode function D in a first iteration of the iteration process are randomly chosen. Additionally, or alternatively, the initial values of the digital precoder W and decode function D in a first iteration of the iterative process are on singular vectors of effective channel HA.

Embodiments herein are useful over conventional techniques. For example, implementation of precoding solutions for physical-layer functional splits with fronthaul compression and generation of a respective decode function for retrieval of an original signal at a respective mobile communication device results in fewer instances of data loss.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes a computer readable storage medium and/or system having instructions stored thereon to facilitate wireless communications. The instructions, when executed by computer processor hardware, cause the computer processor hardware (such as one or more co-located or disparately processor devices) to: produce a decode function D, the decode function D generated via an iterative process based on a digital precoder W and an analog precoder A associated with a wireless base station for transmitting a wireless communication including an original signal; and communicate the decode function D to a decoder associated with a wireless communication device, application of the decode function D to the wireless communication operative to reproduce a rendition of the original signal transmitted in the wireless communication by the wireless base station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
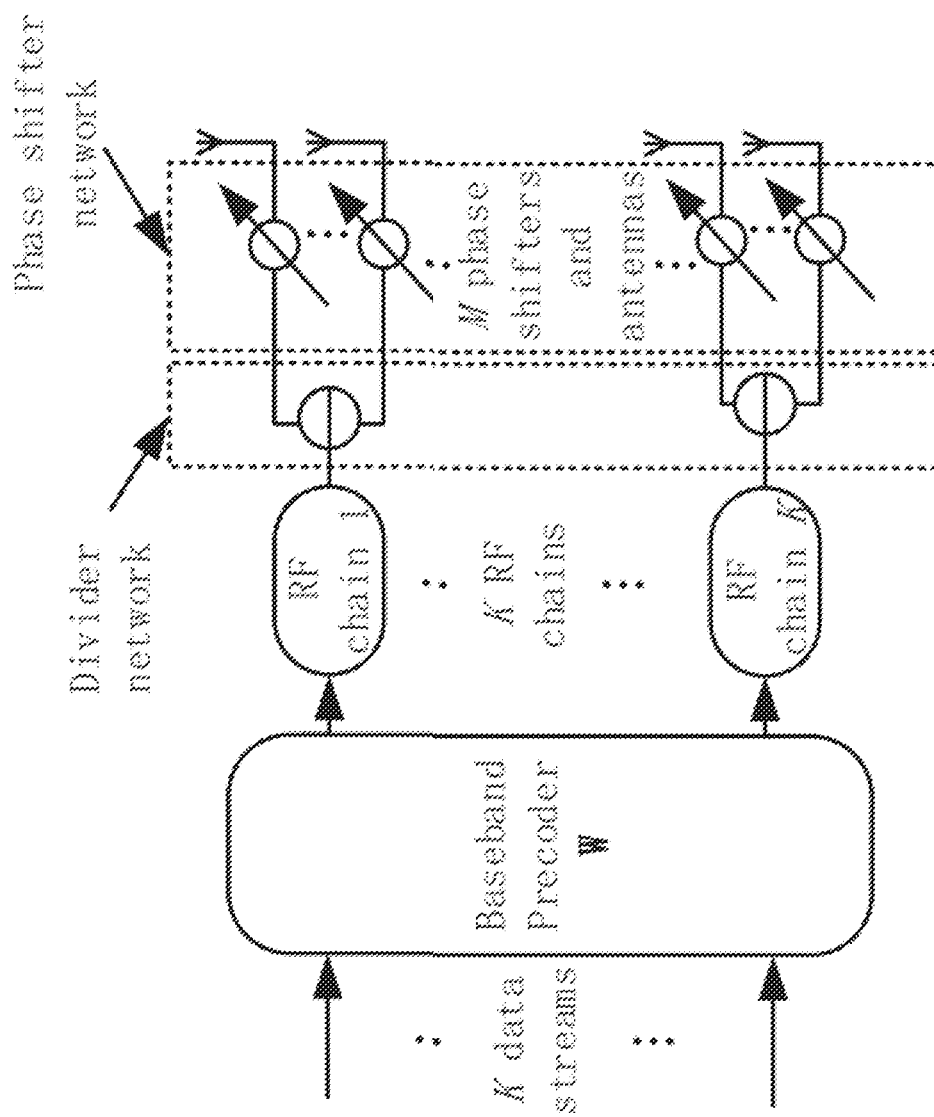
FIG. 1 is an example diagram illustrating a wireless network environment and implementation of a digital pre-coder W and an analog pre-coder A according to conventional techniques.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, a system includes a communication management resource (such as implemented via hardware and/or software). The communication management resource implements an iterative process to derive settings for a digital precoder W (e.g., a matrix), an analog precoder A (e.g., a matrix), and a decode function D (e.g., a matrix). For example, in one embodiment, the iterative process includes: for first instances (configuration) of the digital precoder W and the decode function D, the communication management resource optimizes an instance of the analog precoder A; and based on the optimized instance of the analog precoder A, the communication management hardware optimizes second instances of the digital precoder W and the decode function D. These operations can be repeated such that the iterative process includes, for each iteration of multiple iterations: i) optimizing an instance of the analog precoder A based on respective instances of the digital precoder W and the decode function D, and ii) optimizing an instance of the digital precoder W and the decode function D based on the previously optimized instances of the analog precoder A. In one embodiment, the iterative process is ended when a RATE error value is less than a respective error threshold level.

Thus, embodiments herein include producing a decode function D via an iterative process based on a digital precoder W and an analog precoder A for implementation in a wireless network to transmit a wireless communication including an original signal. A communication management resource or other suitable entity communicates the decode function D to a decoder associated with a wireless communication device (a.k.a., user equipment). The decoder implemented at the wireless communication device applies the decode function D to one or more wireless communications received over multiple antennas of the wireless communication device to reproduce a rendition of the original signal transmitted in a wireless communication from a wireless base station.

In further example embodiments, a communication management resource implements an iterative process to derive settings for digital precoder W, analog precoder A, and decode function D with a bandwidth-limited fronthaul link between the application of digital precoder W and the application of analog precoder A. The iterative process includes: for a first instance of digital precoder W and decode function D, optimize an instance of the analog precoder A; and based on the optimized instance of the analog precoder A, optimize a second instance of the digital precoder W and the decode function D. In one implementation, for each iteration of multiple iterations, the communication management resource: i) optimizes an instance of the analog precoder A based on an instance of the digital precoder W and the decode function D, and ii) optimizes an instance of the digital precoder W and the decode function D based on the instance of the analog precoder A.

Figure 2:
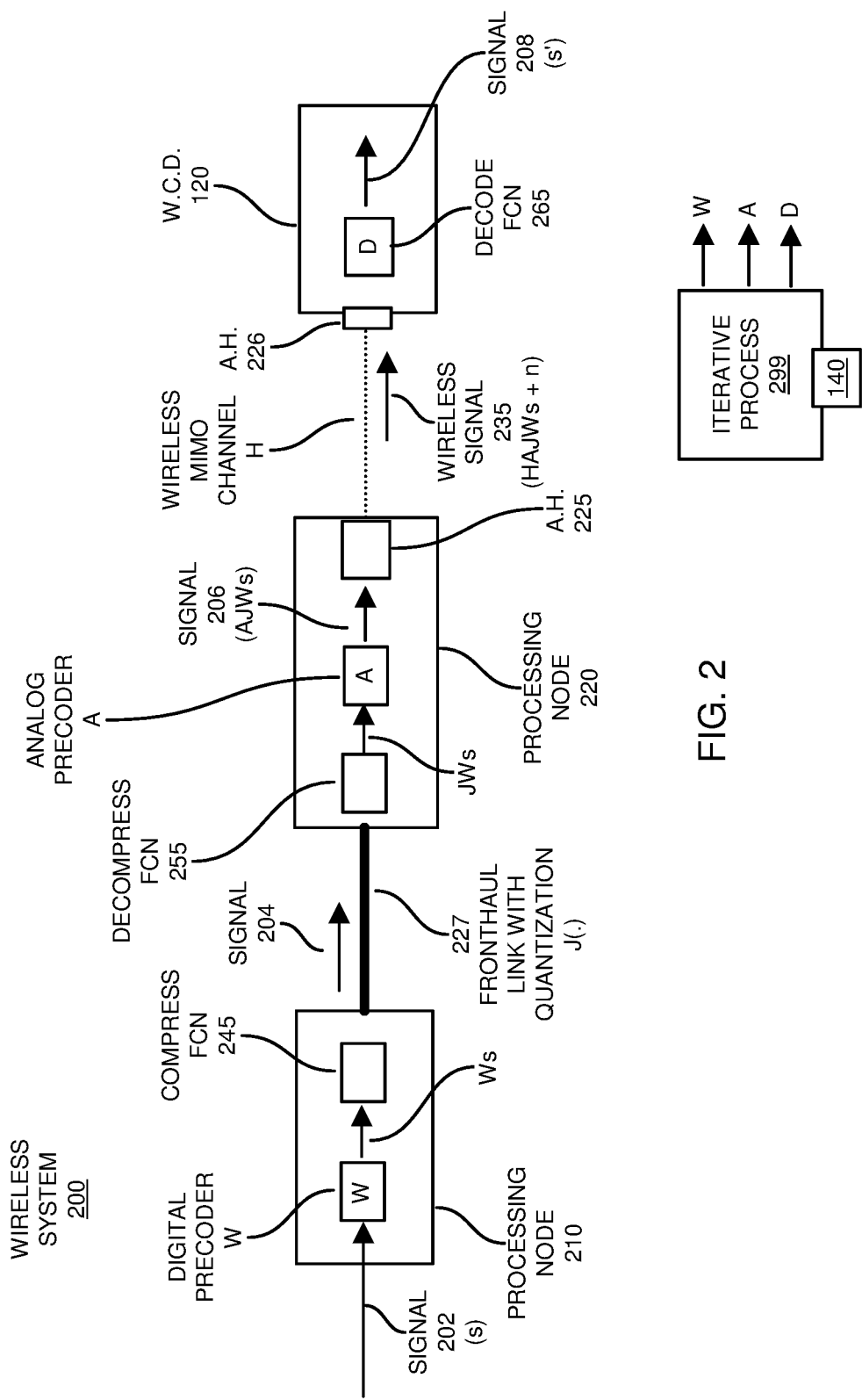
FIG. 2 is an example diagram illustrating a wireless network and implementation of an iterative process to produce settings for a digital pre-coder W, analog pre-coder A and decode function according to embodiments herein.

Now, more specifically, FIG. 2 is an example diagram illustrating a wireless network and implementation of an iterative process to produce settings for a digital pre-coder W, analog pre-coder A and decode function according to embodiments herein.

In this example embodiment, the wireless system 200 includes processing node 210, processing node 220, and wireless communication device 120.

Processing node 210 implements digital pre-coder W and compression function 245.

Processing node 220 implements decompression function 255, analog pre-coder A, and antenna hardware 225 (such as including multiple antennas). Antenna hardware 225 generates wireless signal 235 transmitted to the wireless communication device 120.

The communication management resource 140 executes the iterative process 299 to produce the digital precoder W, analog precoder A, and the decode function D.

Wireless communication device 120 includes antenna hardware 226 to receive the wireless signal 235 and decode function 265 to convert the received wireless signal 235 into signal 208 (reproduction of signal s).

In one embodiment, operations associated with the processing node 210 (processing first network processing layers of a wireless communication protocol) and processing node 220 (processing second network processing layers of a wireless communication protocol) combine to provide wireless base station functionality and generation of respective wireless signal 235 communicated to the wireless communication device 120 (a.k.a., mobile communication device, user equipment, etc.).

As further shown, processing node 210 receives signal 202 (s, such as one or more data streams). The digital pre-coder W (such as a baseband pre-coder, K by K matrix) receives signal 202 (such as one or more streams of data, symbols, etc.) and applies respective pre-coding W to produce signal Ws. The compression function 245 applies compression to the signal Ws and communicates the compressed signal Ws over a respective fronthaul communication link 227 as signal 204 to the processing node 220.

In one embodiment, the algorithm used to compress the signal Ws is lossy. This means that the signal 204 received by the processing node 220 is not identical to the original signal Ws generated at the processing node 210. The effect of quantization associated with the fronthaul link 227 is represented by J (.).

The decompress function 255 associated with the processing node 220 decodes the compressed signal 204 to produce signal JWs. As its name suggests, the analog pre-coder A of processing node 220 applies analog pre-coding to the received signal JWS to produce signal 206 (signal AJWs). As previously discussed, the processing node 220 further includes antenna hardware 225 (such as multiple antennas) over which the respective signal 206 (AJWs) including corresponding data (as represented by s) is communicated to one or more remote communication devices such as including wireless communication device 120.

In one embodiment, as further discussed herein, the configuration of (selection of final settings associated with) digital precoder W, analog precoder A, and decode function D are generated via the iterative process 299 to reduce an amount of data losses associated with signal s as reproduced as s'.

Figure 3:
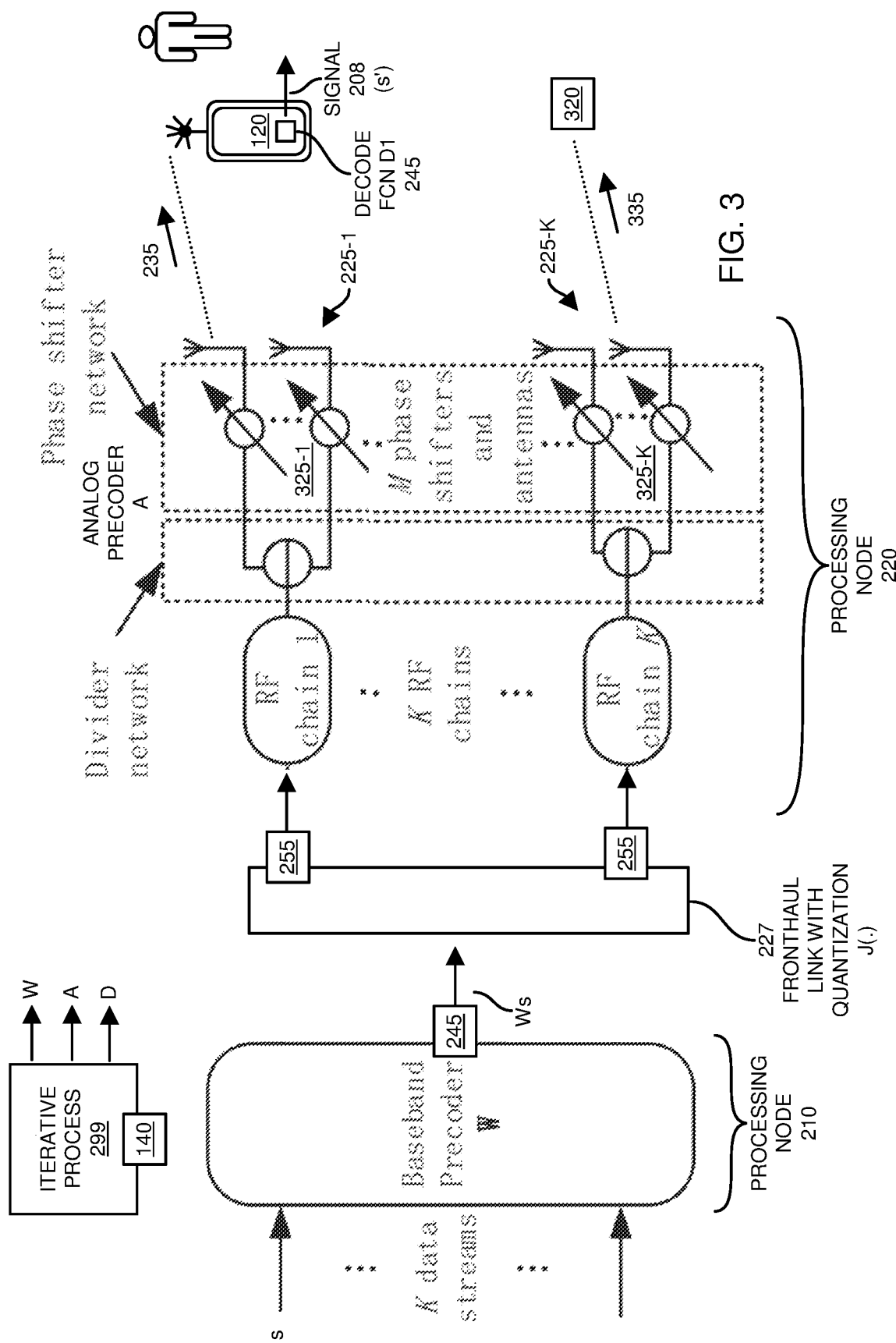
FIG. 3 is an example diagram illustrating a wireless system according to embodiments herein.

FIG. 3 is an example diagram illustrating a wireless system according to embodiments herein.

This example embodiment illustrates implementation of the digital precoder W applied to received K data streams (including signal s). In a manner as previously discussed, the fronthaul communication link 227 conveys compressed signal 204. The processing node 220 implements decompression function 255 and multiple sets of phase shifters and antennas such as set of antennas 225-1 to receive RF chain #1 and transmit signal 208 to the wireless communication device 120. In one embodiment, the antenna hardware 225 includes one hundred antennas and K equals 20. Thus, as an example, five phase shifters 325-1 shift each of the symbols in the RF chain #1 by different amounts to provide appropriate beamforming of transmitting the wireless signal 235 to the wireless communication device 120.

Five phase shifters 325-K shift each of the symbols in the RF chain #K by different amounts to provide appropriate beamforming of transmitting the wireless signal 335 to wireless communication device 320.

Note that the design of a new hybrid MIMO precoding scheme as discussed herein may include starting with the assumption that the digital precoder W is applied at the first processing node 210 (such as a DU) and analog precoder A is applied at a processing node 220 (such as an RU). However, note that the pre-coder processing and decoder processing can be implemented anywhere in a respective wireless network.

In further example embodiments, the overall downlink (DL) transmit signal vector associated with wireless signal 235 on an arbitrary subcarrier that accounts for fronthaul quantization can be written as:

$$x = AJ(Ws),$$

where J(.) is a non-linear function that models the cumulative quantization effect after fronthaul compression and decompression associated with fronthaul 227. For example, $J(.) = F^{-1}(F(.))$ where F(.) is mu-law compression.

In one embodiment, the wireless communication device 120 implements K antennas to receive wireless signal 235. In such an instance, the K-antenna UE receives signal y (a.k.a., signal 235) in which:

$$y = HAJ(Ws) + n$$

The wireless communication device 120 applies a combiner matrix decode function D to recover the information signal: $\tilde{s} = D^H y$. In one embodiment, decode function D is an M×K matrix.

Note that multiple different approaches are possible for achieving matrix optimization. For example, in one embodiment, all three matrices A, W, D are computed jointly by the communication management resource 140 associated with the gNB (such as via iterative process 299) and the communication management resource 140 communicates decode function D the wireless communication device 120. Additionally, or alternatively, the wireless communication device 120 computes decode function D independently. The former approach is further described below.

Further in this example embodiment, let R(H) denote the achievable information data rate of communicating data and/or symbols for a given channel and Tr(.) the matrix trace. In one embodiment, the hybrid MIMO optimization via iterative process 299 is the computation of matrices A, W, D, subject to a transmit power constraint, P, at the processing node 220 (such as RU) and a phase shift codebook B on elements of A:

$$\max_{A,W,D} R(H)$$

$$s.t.\ Tr(AJ(Ws)QJ(Ws)^H A^H) \leq P$$

$$[A](i,j) = 1/\sqrt{M}(e^{j\theta} \cdot \theta \in B, \forall i,j)$$

One operation of the iterative process 299 or other suitable entity is to compute a tractable expression for wireless data rate R(H). In one embodiment, the iterative process 299 includes replacing the non-linear term J(Ws) with a statistically equivalent linear approximation based on the Bussgang decomposition for non-linear memoryless distortion functions:

$$J(Ws) \approx KWs + z$$

where matrix K is a K×K deterministic diagonal matrix and quantization noise matrix z is uncorrelated with precoder matrix W and signal s.

The wireless signal 235 received by the wireless communication device 120 is then:

$$y = HA(KWs + z) + n,$$

where n represents noise in the wireless channel.

The achievable downlink (DL) data rate from the processing node 220 to the wireless communication device 120 can be written as:

$$R(H) = \log_2(\det[I + R_n^{-1} D^H HAKWQW^H A^H K^H H^H D])$$

where det(.) is the matrix determinant, I is an identity matrix, $R_n = \sigma_n^2 D^H D + \sigma_z^2 D^H HAA^H H^H$ is the effective noise covariance at the wireless communication device 120, $\sigma_n^2$ is the noise variance of n, $\sigma_z^2$ is the noise variance of z, Q is the covariance matrix of data s. The optimization problem is now:

$$\max_{A,W,D} \quad R(H) = \log_2(\det[I + R_n^{-1} D^H HAKWQW^H K^H A^H H^H D])$$

$$s.t.\ Tr(AKWQW^H K^H A^H + \sigma_z^2 AA^H) \leq P$$

$$[A]_{i,j} = 1/\sqrt{M}\ e^{j\theta},\ \theta \in B, \forall i,j$$

Note that the above non-convex rate maximization problem with power and phase shift constraints may be very challenging to solve in closed-form or via exhaustive search, or via numerical methods.

Figure 4:
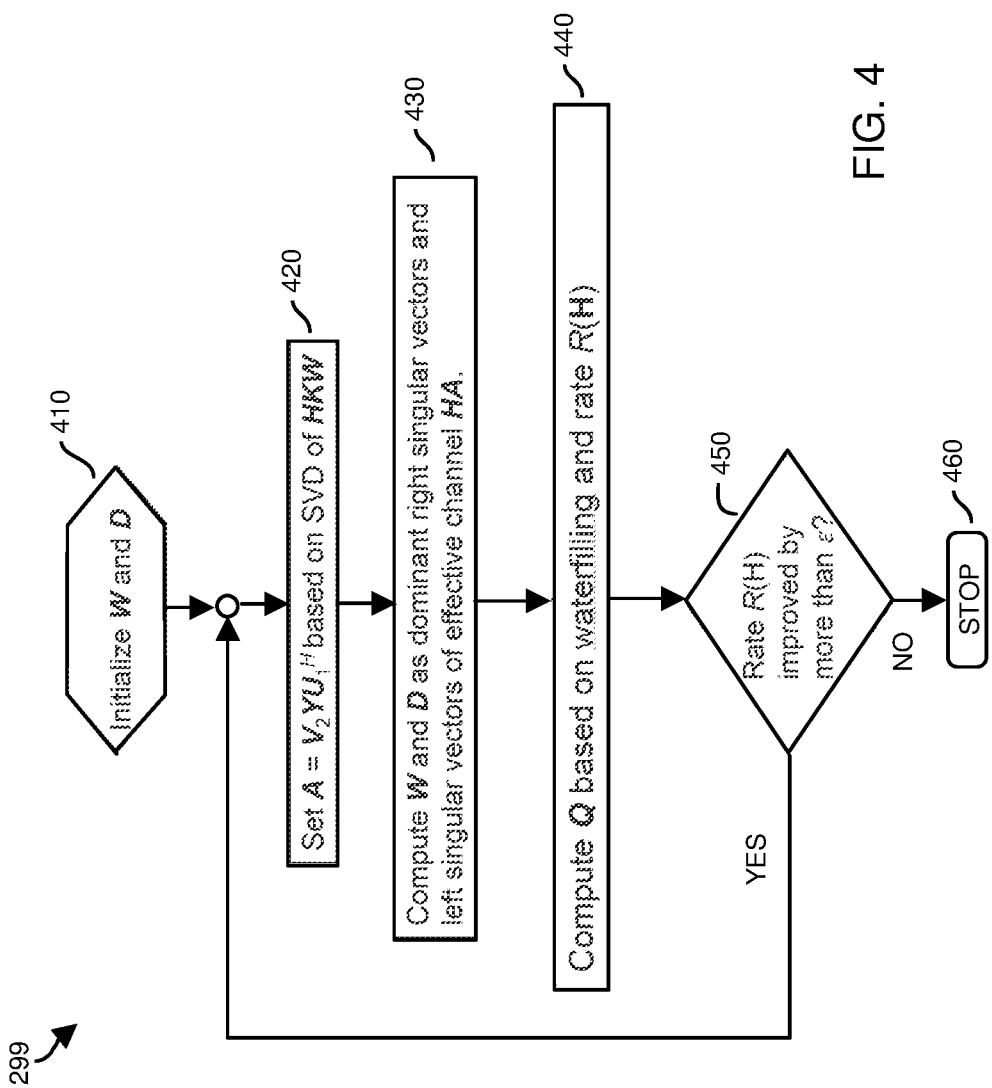
FIG. 4 is a diagram illustrating an example iterative process to produce settings for a digital pre-coder W, analog pre-coder A, and decode function D according to embodiments herein.

FIG. 4 is a diagram illustrating an example iterative process to produce settings for digital pre-coder W, analog pre-coder A, and decode function D according to embodiments herein.

As a non-limiting example, the iterative process 299 includes an iterative solution based on alternating optimizations. For example, for a fixed W, D, the iterative process optimizes for A; then for the obtained A, the iterative process 299 optimizes for W and D. This is repeated until a stopping criterion (such as when the rate R (H) is improved by less than an error threshold level) is satisfied.

Convergence to a global optimum for digital precoder W, analog precoder A, and decode function D is not guaranteed. The steps are as follows:

Via operation 410, the iterative process 299 initializes W and D in the first iteration. The initial values can be randomly chosen or based on the singular vectors of channel H.

In processing operation 420, the iterative process 299 sets $A = V_2 Y U_1^H$, where $V_2$ is the set of right singular vectors of decode function D, U1 is the set of left singular vectors of HKW and Y is a diagonal power allocation matrix that can be obtained using waterfilling. In general, water filling is an algorithm for equalization on communications channels. As the name suggests, just as water finds its level even when filled in one part of a vessel with multiple openings, as a consequence of Pascal's law, the amplifier systems in communications network repeaters, or receivers amplify each channel up to the required power level compensating for the channel impairments.

In one embodiment, for a generated instance of W and D, the system model is equivalent to a one-hop MIMO amplify-and-forward relay channel. The optimal MIMO relay pre-coder for this system has a known structure. The iterative process 299 then quantizes the phase of the elements of analog precoder A to the nearest value in codebook B.

Based on the above generated value for analog precoder A, in processing operation 430, the iterative process 299 computes digital precoder W and decode function D by setting them to the dominant right singular vectors and left singular vectors of the effective channel HA. In one embodiment, in processing operation 440, the iterative process 299 computes Q based on waterfilling.

If the stopping criterion of the improvement in R(H) after the latest iteration being less than error threshold level ε is met, in processing operation 450 the iterative process 299 then normalizes A and W to meet the power constraint P, and stops. The generated values for digital precoder W, analog precoder A, and decode function D are then used in communication system 200. Alternatively, if the rate R(H) improves by more than error threshold level ε, then the iterative process 299 continues at operation 420.

Thus, assume that for iteration #1 at operation 410, the digital precoder W is initialized as $W_0$ and the decode function D is initialized as decode function Do. In operation 420, the analog precoder A is optimized (derived) as $A_1$ based on initial values of $W_0$ and $D_0$. In operation 430, the iterative process 299 computes optimized settings for $W_1$ and $D_1$ based on analog precoder $A_1$. The iterative process 299 computes Q and a rate R(H) based on $W_1$, $A_1$, and $D_1$. If the rate R(H) is not sufficiently improved above a threshold level for the first iteration, processing continues at 420.

For iteration #2 at operation 420, the analog precoder A is optimized (derived) as $A_2$ based on values of $W_1$ and $D_1$. In operation 430, the iterative process 299 computes optimized settings for $W_2$ and $D_2$ based on analog precoder $A_2$. The iterative process 299 computes Q and a rate R(H) based on $W_2$, $A_2$, and $D_2$. If the rate R(H) is not sufficiently improved above a threshold level for the second iteration in operation 450, processing continues at 420.

For iteration #3 at operation 420, the analog precoder A is optimized (derived) as $A_3$ based on values of $W_2$ and $D_2$. In operation 430, the iterative process 299 computes optimized settings for $W_3$ and $D_3$ based on analog precoder $A_3$. The iterative process 299 computes Q and a rate R(H) based on $W_3$, $A_3$, and $D_3$. If the rate R(H) is sufficiently improved above a threshold level for the third iteration, processing is terminated at operation 460. Assuming termination and sufficient convergence in operation 460, final settings are selected as digital precoder $W_3$ (and is applied at processing node 210), analog precoder $A_3$ (and is applied at processing node 220), and decode function $D_3$ (and is applied to communication device 120).

Thus, the iterative process 299 repeats this loop (any number of iterations) until convergence of rate R(H) and corresponding settings for digital precoder W, analog precoder A, and decode function D for a respective iteration based on operation 45 . Other possible solution techniques are to linearize the data rate objective function and replace the constraints with convex approximations before solving numerically.

As previously discussed, the wireless communication device 120 may generate settings for digital precoder W, analog precoder A, and/or decode function D. If it is desired that the wireless communication device 120 computes decode function D independently, the wireless communication device 120 can be configured to use the well-known LMMSE receiver filter for the effective channel HAKW.

Figure 5:
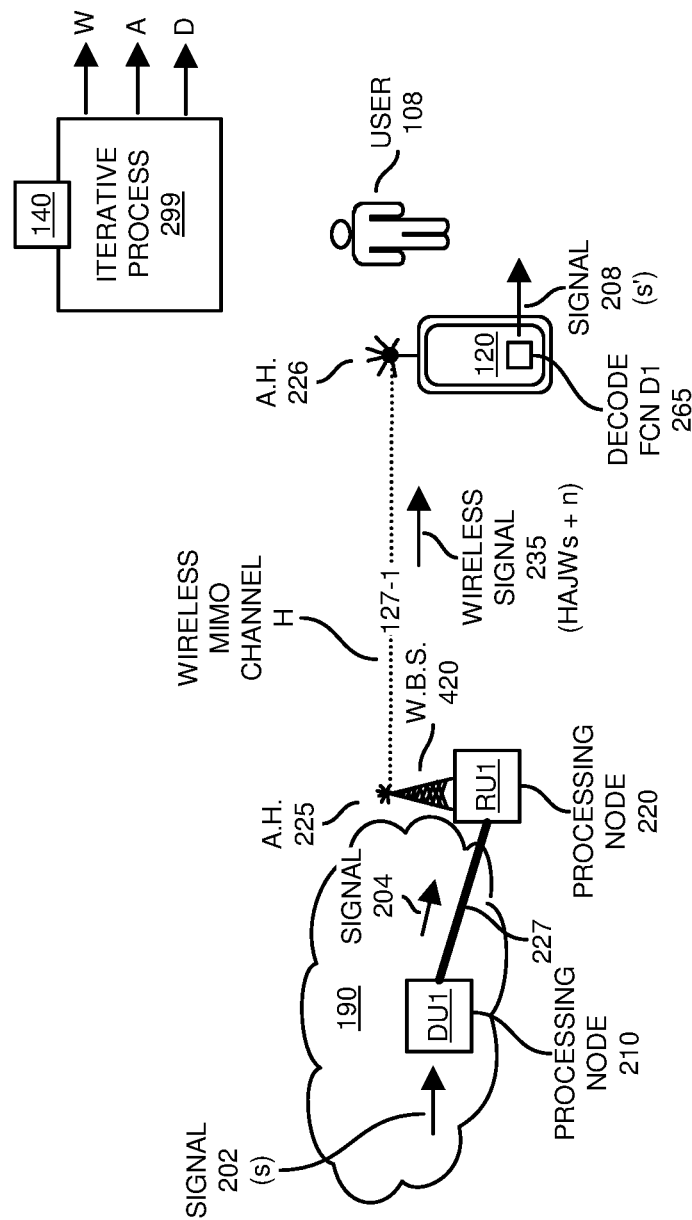
FIG. 5 is an example diagram illustrating components of a wireless network and implementation of a digital pre-coder W, analog pre-coder A, and a decode function D according to embodiments herein.

FIG. 5 is an example diagram illustrating components of a wireless network and implementation of a digital pre-coder W, analog pre-coder A, and a decode function according to embodiments herein.

In this example embodiment, the wireless system includes processing node 210, processing node 220, and wireless communication device 120.

Processing node 210 implements digital pre-coder W (such as $W_3$) and compression function 245. Processing node 220 implements decompression function 255, analog pre-coder A (such as $A_3$), and antenna hardware 225 (such as including multiple antennas). Antenna hardware 225 generates wireless signal 235 transmitted to the wireless communication device 120.

Wireless communication device 120 includes antenna hardware 226 to receive the wireless signal 235 and decode function 265 to convert the received wireless signal 235 into signal 208 (s'). As previously discussed, convergence of the value R(H) results in optimized settings for digital precoder W, analog precoder A, and decode function D. These are applied at the different resources to reduce an error of generating signal s' (where s' is a reproduced rendition of original signal s).

In one embodiment, operations associated with the processing node 210 and processing node 220 combine to provide wireless base station 420 functionality and generation of respective wireless signal 235 communicated to the wireless communication device 120 (a.k.a., mobile communication device, user equipment, etc.).

In further example embodiments, the communication management resource 140 or other suitable entity implements iterative process 299 to produce a decode function D. As previously discussed, the decode function D is generated via an iterative process 299 based on a digital precoder W and an analog precoder A implemented in a wireless network to transmit a wireless communication including an original signal s.

In one embodiment, the iterative process 299 includes: for each iteration of multiple iterations: i) optimizing an instance of the analog precoder A based on an instance of the digital precoder W and the decode function D, and ii) optimizing an instance of the digital precoder W and the decode function D based on the optimized instance of the analog precoder A.

Subsequent to finalizing configurations of the digital precoder W, analog precoder A, and the decode function D, the communication management resource 140 or other suitable entity communicates the finalized decode function D to a decoder associated with the wireless communication device 120. The decoder of the wireless communication device 120 applies the decode function D to the wireless communications (such as wireless signal 235) received over multiple antennas (such as K antennas of antenna hardware 226) of the wireless communication device 120 to reproduce a rendition of the original signal s transmitted or encoded in the wireless signal 235 by the wireless base station 420.

Application of the decode function D to the wireless signal 235 received over multiple antennas (antenna hardware 226) of the wireless communication device 120 reproduces a rendition of the original signal s transmitted in the wireless signal 235 (i.e., wireless communication) by the wireless base station 420.

Further, as previously discussed, in addition to generating the decode function D, the iterative process 299 implemented by the communication management resource 140 includes generating the digital precoder W and the analog precoder A. For example, in one embodiment, the iterative process 299 includes: for a first instance of digital precoder W and decode function D, the iterative process 299 optimizes an instance of the analog precoder A; and based on the optimized instance of the analog precoder A, the communication management resource executing iterative process 299 optimizes a second instance of the digital precoder W and the decode function D. These operations are repeated such that the iterative process includes, for each iteration of multiple iterations of the iterative process 299: i) optimizing an instance of the analog precoder A based on an instance of the digital precoder W and the decode function D, and ii) optimizing an instance of the digital precoder W and the decode function D based on the instance of the analog precoder A. The error associated with implementing these functions eventually converges.

Subsequent to converging on final configurations of decode function D, the digital precoder W, and the analog precoder A, via the iterative process, embodiments herein include implementing the final digital precoder W at a first processing node 210 (such as DU1) in the wireless network; and implementing the final analog precoder A at a second processing node 220 (such as RU1) in the wireless network. The analog precoder A is applied to a signal JWs received over a fronthaul communication link 127 from the first processing node 210 to produce a second signal 206 (such as signal AJWs).

Further example embodiments herein include, via the communication management resource 140, implementing the iterative process 299 to include producing the decode function D to account for (such as provide correction for) a quantization effect of compression applied by the first processing node 210 and decompression applied by the second processing node 211 associated with the wireless base station 420.

Still further example embodiments herein include implementing a digital precoder W at a first processing node 210 in a wireless network; the digital precoder W is applied to a received (original) signal 202 (s) to produce signal Ws; the first processing node 210 transmits a compressed rendition of Ws over the fronthaul communication link 227 to the second processing node 210 in the wireless network. The second processing node 220 implements analog precoder A. The analog precoder A is applied to a signal JWs received over the fronthaul communication link 127 from the first processing node 210 to produce signal AJWs, where J represents a non-linear function modeling a quantization effect of compression applied by the first processing node 210 and decompression applied by the second processing node 220. The second processing node 220 wirelessly transmits signal AJWs over the wireless channel H as HAJWs to a wireless communication device (user equipment) in the wireless network.

The wireless communication device 120 applies the decode function D to a respective wireless signal HAJWs+n received at the wireless communication device 120 from the second processing node 220. Application of the decode function D to the wireless signal HAJWs+n produces signal s', where data s' retrieved or derived from the respective wireless signal HAJWs+n is a rendition of original signal s, and where n represents noise associated with wireless channel H.

In further example embodiments, the communication management resource 140 or other suitable entity generates the decode function D at the second processing node or other suitable entity; the second processing node communicates the decode function D from the second processing node to the user equipment. Additionally, or alternatively, the decode function D is generated at the user equipment.

The signals s and s' can be implemented in any suitable manner. In one embodiment, the signal s and signal s' are QAM signals.

Note further that the iterative processes 299 described herein can be implemented in any suitable manner. In one embodiment, implementation of the iterative process to produce the decode function D, digital pre-coder W, and/or analog pre-coder A includes: a.) initializing digital precoder $W_1$ and decode function $D_1$ in a first iteration i of the iterative process; b.) setting $Ai=V_2YU_1^H$, where i indicates the iteration number, where $V_2$ is a set of right singular vectors of decode function D, $U_1$ is a set of left singular vectors of HKW, and Y is a diagonal power allocation matrix obtained via waterfilling; and c.) based on Ai, computing digital precoder $W_1$ and decode function $D_1$ by setting them to dominant right singular vectors and left singular vectors of an effective channel HA; computing Q based on waterfilling and rate R(H).

In still further example embodiments, the iterative process 299 further includes: d.) in response to detecting that a stopping criterion of improvement in rate R(H) after a latest iteration of the iterative process is less than error value ε: i) normalizing analog precoder A and digital precoder W to meet power constraint P, and ii) terminating the iterative process. Alternatively, the iterative process 299 further includes: d.) in response to detecting that a stopping criterion of improvement in rate R(H) after a latest iteration of the iterative process is greater than an error value ε: i) continuing execution of the iterative process at operation b. Upon termination, the most recent iteration values of digital precoder Wi, analog precoder Ai, and decode function $D_1$ become the final digital precoder W, analog precoder A, and decode function D implemented in respective resources as discussed herein.

In one embodiment, initial values of the digital precoder W and decode function D in a first iteration of the iteration process are randomly chosen. Additionally, or alternatively, the initial values of the digital precoder W and decode function D in a first iteration of the iterative process are on singular vectors of effective channel HA.

Figure 6:
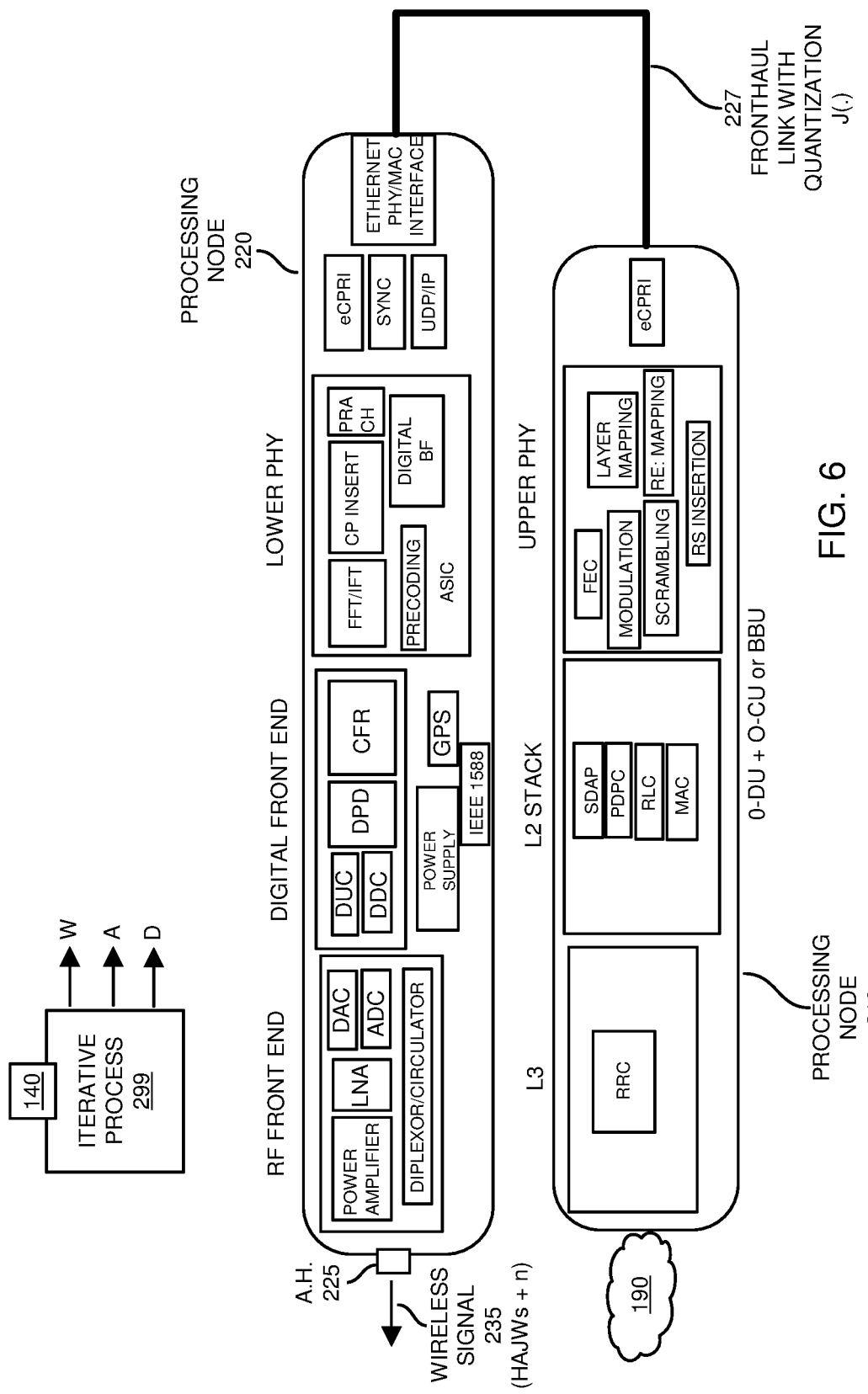
FIG. 6 is an example diagram illustrating details of multiple processing nodes according to embodiments herein.

FIG. 6 is an example diagram illustrating details of multiple processing nodes according to embodiments herein.

In this example embodiment, the processing node 210 implements processing for layers L3, L2 stack, and Upper PHY. Processing node 220 implements processing for Lower PHY as well as digital front end processing and RF front end processing.

Note that further embodiments herein include implementations of the proposed hybrid precoding scheme in a disaggregated 5G wireless system.

For example, a first requirement is for the processing node 210 (such as gNB DU) to acquire channel state information H. This can be obtained using SRS (Sounding Reference Signal) reciprocity in TDD (time-division duplex) systems or Type-II CSI feedback in NR FDD (New Radio Frequency Division Duplex) systems.

The gNB can estimate the quantization noise variance $\sigma_z^2$ based on the choice of the fronthaul compression scheme.

In a 5G system, it may be more practical for the UE to compute decode function D independently. In further example embodiments, the gNB can be configured to estimate the LMMSE (Linear Minimum Mean Square Error) receiver used by the UE for the joint optimization in a manner as previously discussed. The UE computes the effective channel based on DL DMRS (demodulation reference signal).

Figure 7:
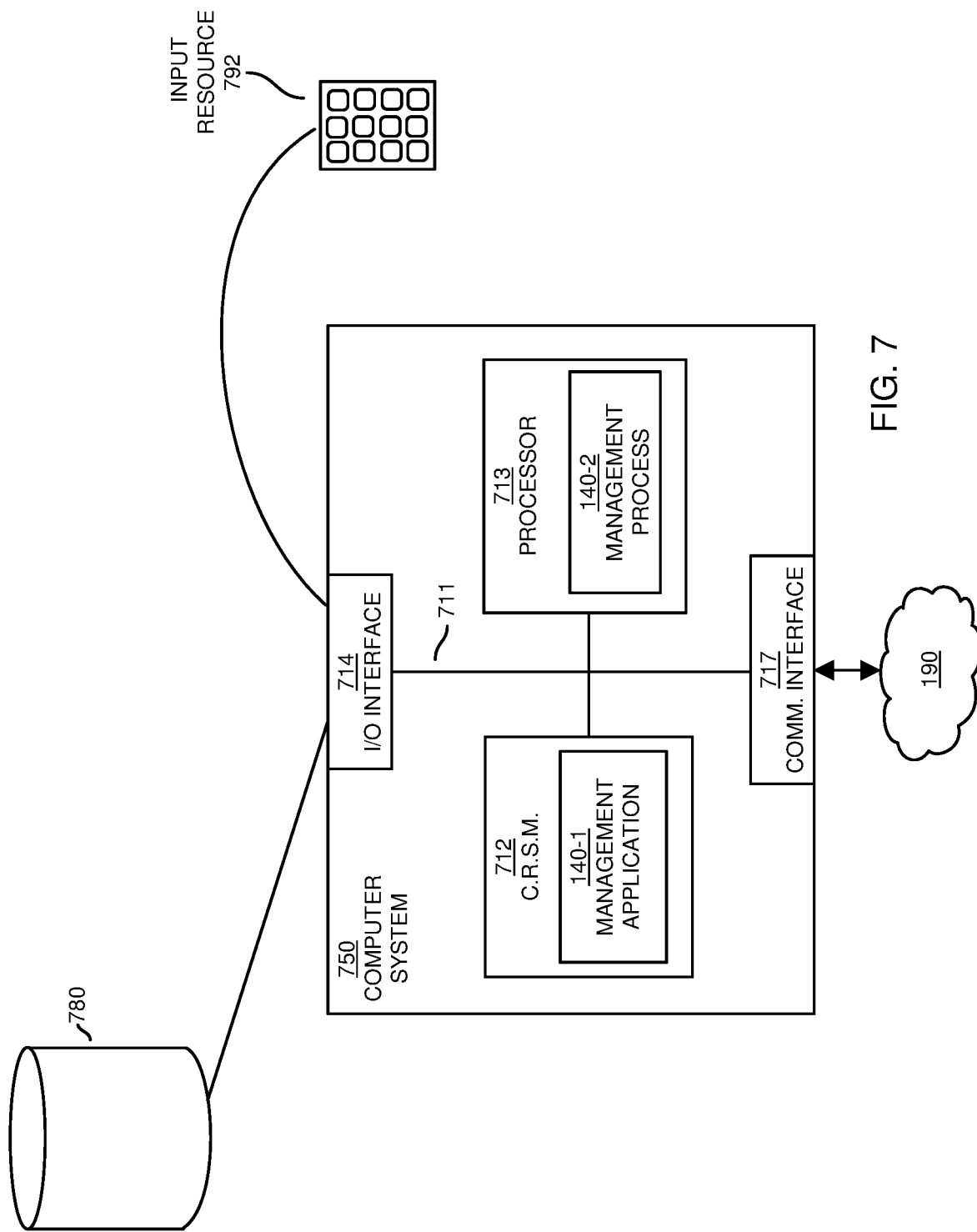
FIG. 7 is an example diagram illustrating example computer architecture operable to execute one or more operations according to embodiments herein.

FIG. 7 is an example block diagram of a computer system for implementing any of the operations as previously discussed according to embodiments herein.

Any of the resources (such as wireless station, wireless communication device, communication management resource 140, etc.) as discussed herein can be configured to include computer processor hardware and/or corresponding executable instructions to carry out the different operations as discussed herein.

As shown, computer system 750 of the present example includes interconnect 711 coupling computer readable storage media 712 such as a non-transitory type of media (which can be any suitable type of hardware storage medium in which digital information can be stored and or retrieved), a processor 713 (computer processor hardware), I/O interface 714, and a communications interface 717.

I/O interface(s) 714 supports connectivity to repository 780 and input resource 792.

Computer readable storage medium 712 can be any hardware storage device such as memory, optical storage, hard drive, floppy disk, etc. In one embodiment, the computer readable storage medium 712 stores instructions and/or data.

As shown, computer readable storage media 712 can be encoded with communication management application 140-1 (e.g., including instructions) in a respective wireless station to carry out any of the operations as discussed herein.

During operation of one embodiment, processor 713 accesses computer readable storage media 712 via the use of interconnect 711 in order to launch, run, execute, interpret or otherwise perform the instructions in communication management application 140-1 stored on computer readable storage medium 712. Execution of the communication management application 140-1 produces communication management process 140-2 to carry out any of the operations and/or processes as discussed herein.

Those skilled in the art will understand that the computer system 750 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIG. 8. Note that the steps in the flowcharts below can be executed in any suitable order.

Figure 8:
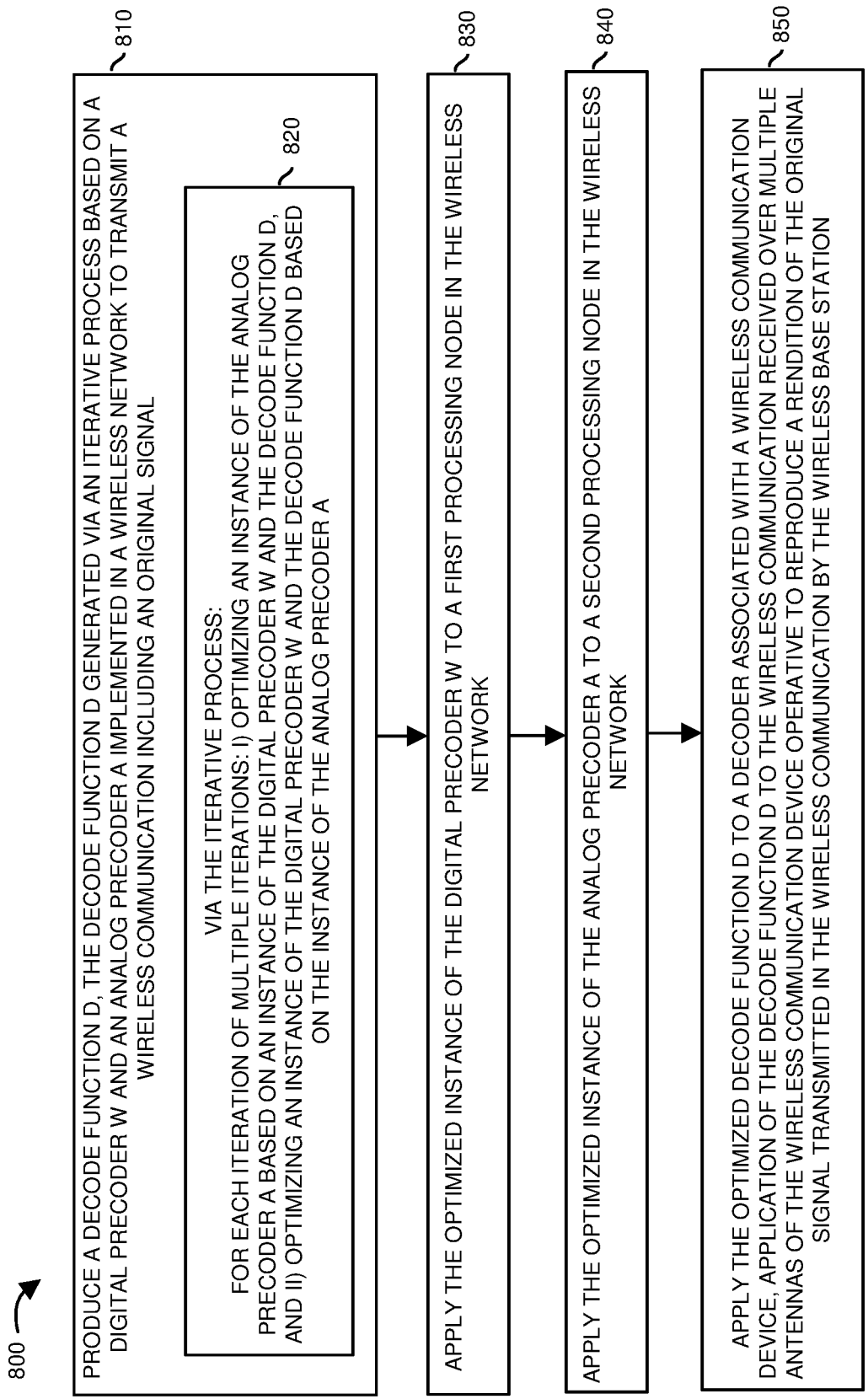
FIG. 8 is an example diagram illustrating a method according to embodiments herein.

FIG. 8 is a flowchart 800 illustrating an example method according to embodiments herein. Note that there will be some overlap with respect to concepts as discussed above.

In processing operation 810, the communication management resource 140 produces a decode function D; the decode function D is generated via an iterative process based on a digital precoder W and an analog precoder A implemented in a wireless network to transmit a wireless communication including or conveying an original signal.

In sub-processing operation 820 of processing operation 810, via the iterative process, the communication management resource 140 performs operations of: for each iteration of multiple iterations: i) optimizing an instance of the analog precoder A based on an instance of the digital precoder W and the decode function D, and ii) optimizing an instance of the digital precoder W and the decode function D based on the optimized instance of the analog precoder A. Via the iterative process, the communication management resource produces a final digital precoder W, a final analog precoder A, and a final decode function D.

In processing operation 830, the communication management resource 140 or other suitable entity applies the optimized final digital precoder W at a first processing node 210 in the wireless network.

In processing operation 840, the communication management resource 140 or other suitable entity applies the optimized instance of the analog precoder A at a second processing node 220 in the wireless network.

In processing operation 850, the communication management resource applies (or communicates) the optimized final decode function D to a decoder associated with a wireless communication device 120. Application of the final decode function D to the wireless communication(s) received over multiple antennas of the wireless communication device to reproduces a rendition of the original signal(s) transmitted (conveyed) in the wireless communication from the wireless base station (such as the second processing node).

Note again that techniques herein are well suited to facilitate communication of data in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
at a wireless communication device:
receiving a decode function D;
via antenna hardware of the wireless communication device, receiving a wireless signal transmitted from a wireless station, the wireless signal received by multiple antennas of the antenna hardware of the wireless communication device, the wireless signal including a first signal generated by the wireless station;
applying the decode function D to the first signal in the received wireless signal, the applying of the decode function D to the wireless signal reproducing a rendition of an original signal used by the wireless station to produce the first signal transmitted by the wireless station; and
wherein the applying of the decode function D to the first signal in the received wireless signal provides error correction associated with a quantization effect of compression and decompression applied to the original signal at the wireless station to produce the first signal.

2. The method as in claim 1, wherein the decode function D is generated based on a digital precoder W and an analog precoder A, a combination of the digital precoder W and the analog precoder A implemented by the wireless station for producing and transmitting the wireless signal.

3. The method as in claim 2, wherein the first signal received in the wireless signal is generated via the wireless station:
applying the digital precoder W to produce a second signal;
applying a compression function to the second signal to produce a third signal;
applying a decompression function to the third signal to produce a fourth signal; and
applying the analog precoder A to the fourth signal to produce the first signal included in the wireless signal transmitted to the wireless station.

4. The method as in claim 1, wherein the wireless signal including the first signal transmitted by the wireless station is derived from the compression of the original signal into a compressed original signal and the decompression of the compressed original signal prior to transmission of the wireless signal from the wireless station to the wireless communication device.

5. The method as in claim 4, wherein the decompression of the compressed original signal results in a quantization error associated with a compression function used to produce the compressed original signal.

6. The method as in claim 1,
wherein the decode function D is generated prior to transmission of the wireless signal from the wireless station to the wireless communication device.

7. The method as in claim 1, wherein applying the decode function D includes:
via computer processor hardware at the wireless communication device implementing a decoder, via the applying of the decode function D to the received wireless signal by the decoder, decoding the first signal in the received wireless signal to reproduce the rendition of the original signal.

8. The method as in claim 1, wherein the first signal in the wireless signal is derived from the compression of the original signal into a compressed original signal and the decompression of the compressed original signal prior to transmission of the wireless signal from the wireless station to the wireless communication device; and
wherein generation of the decode function D occurs prior to transmission of the wireless signal from the wireless station to the wireless communication device.

9. The method as in claim 1, wherein the first signal in the wireless signal is derived from the compression of the original signal into a compressed original signal and the decompression of the compressed original signal prior to transmission of the wireless signal from the wireless station to the wireless communication device;
wherein the decompression of the compressed original signal results in a quantization error associated with a compression function used to produce the compressed original signal; and
wherein the applying of the decoder function D to the wireless signal provides correction of an error in the first signal with respect to the original signal.

10. The method as in claim 1, wherein the wireless station is operative to implement a compression function and a decompression function between a digital precoder W and an analog precoder A to produce the first signal transmitted in the wireless signal.

11. The method as in claim 1, wherein the wireless signal transmitted by the wireless station is derived from compression of the original signal into a compressed original signal and decompression of the compressed original signal into a decompressed signal prior to transmission of the wireless signal from the wireless station to the wireless communication device; and
wherein the first signal received in the wireless signal is a decompressed version of the compressed original signal.

12. The method as in claim 1, wherein the error correction results in the rendition of the original signal being substantially similar to the original signal.

13. A method comprising:
communicating a decode function D to a wireless communication device;
transmitting a wireless signal from a wireless station to multiple antennas of the wireless communication device; and
wherein the wireless communication device is operable to apply the decode function D to the wireless signal, the decode function D applied to the wireless signal to reproduce a rendition of an original signal transmitted by the wireless station, the reproduced rendition of the original signal providing correction of an error in a first signal received in the wireless signal, the error caused by application of a compression function and decompression function to the original signal.

14. A system comprising:
a mobile communication device operative to: receive a decode function D;
via antenna hardware of the mobile communication device, receive a wireless signal from a wireless station over multiple antennas of the mobile communication device; and apply the decode function D to the wireless signal, application of the decode function D to the wireless signal operative to reproduce a rendition of an original signal transmitted by the wireless station, the reproduced rendition of the original signal providing correction of an error in a first signal received in the wireless signal, the error in the first signal produced via application of a compression function and a decompression function to the original signal.

15. The system as in claim 14, wherein the error is a quantization error associated with application of the compression function and the decompression function to the original signal.

16. The system as in claim 15, wherein the decode function D is based on a digital precoder W and an analog precoder A, a combination of the digital precoder W and the analog precoder A associated with the wireless station for transmitting the wireless signal.

17. The system as in claim 14, wherein the wireless signal is derived from compression of the original signal into a compressed signal via the compression function and decompression of the compressed original signal via the decompression function prior to transmission of the wireless signal by the wireless station.

18. The system as in claim 17, wherein the decompression of the compressed original signal results in a quantization error associated with the compression function and the decompression function.

19. The system as in claim 14, wherein the error is a quantization error;
wherein the decode function D provides correction of the quantization error due to compression/decompression associated with the original signal; and
wherein generation of the decode function D occurs prior to transmission of the wireless signal from the wireless station to the wireless communication device.

20. Computer-readable storage hardware having instructions stored thereon, the instructions, when carried out by computer processor hardware at a wireless communication device, cause the computer processor hardware to:
receive a decode function D;
via antenna hardware at the wireless communication device, receive a wireless signal from a wireless station over multiple antennas of the wireless communication device; and
apply the decode function D to the wireless signal, the decode function D applied to the wireless signal to reproduce a rendition of an original signal used by the wireless station to produce the wireless signal transmitted by the wireless station, the reproduced rendition of the original signal via the decode function D operative to provide correction of an error in the wireless signal caused by compression and decompression of the original signal at the wireless station.

\* \* \* \* \*